(12) United States Patent
Kienke

(10) Patent No.: US 8,820,837 B2
(45) Date of Patent: Sep. 2, 2014

(54) LOCKING DEVICE, ESPECIALLY FOR AN ADJUSTMENT FITTING AND ESPECIALLY FOR A VEHICLE SEAT, AND VEHICLE SEAT

(75) Inventor: Ingo Kienke, Wermelskirchen (DE)

(73) Assignee: Johnson Controls Technology Company, Holland, MI (US)

(*) Notice: Subject to any disclaimer, the term of this patent is extended or adjusted under 35 U.S.C. 154(b) by 470 days.

(21) Appl. No.: 13/125,290

(22) PCT Filed: Oct. 5, 2009

(86) PCT No.: PCT/EP2009/007103
§ 371 (c)(1),
(2), (4) Date: Jul. 11, 2011

(87) PCT Pub. No.: WO2010/046024
PCT Pub. Date: Apr. 29, 2010

(65) Prior Publication Data
US 2011/0260515 A1    Oct. 27, 2011

(30) Foreign Application Priority Data

Oct. 23, 2008  (DE) .................... 10 2008 052 893

(51) Int. Cl.
*B60N 2/235*   (2006.01)
(52) U.S. Cl.
USPC ...................................... 297/367 R
(58) Field of Classification Search
USPC ................. 297/362, 367 R, 378.11
See application file for complete search history.

(56) References Cited

U.S. PATENT DOCUMENTS

| | | | |
|---|---|---|---|
| 4,314,729 A * | 2/1982 | Klueting | 297/366 |
| 4,705,319 A * | 11/1987 | Bell | 297/362 |
| 5,328,241 A * | 7/1994 | Haider | 297/367 R |
| 5,718,481 A * | 2/1998 | Robinson | 297/367 R |
| 6,209,955 B1 * | 4/2001 | Seibold | 297/216.13 |
| 6,502,903 B2 * | 1/2003 | Bruck et al. | 297/378.11 |
| 6,644,746 B2 * | 11/2003 | Bruck et al. | 297/378.11 |
| 6,659,558 B2 | 12/2003 | Sugimoto | |
| 7,527,336 B2 * | 5/2009 | Kienke et al. | 297/374 |
| 7,604,297 B2 * | 10/2009 | Weber | 297/367 R |
| 2002/0171279 A1 | 11/2002 | Pleskot | |

FOREIGN PATENT DOCUMENTS

| | | |
|---|---|---|
| DE | 10 2005 047 348 A1 | 4/2006 |
| JP | 2006-521126 | 9/2006 |
| JP | 2008-514321 | 5/2008 |
| WO | 2006/037470 A2 | 4/2006 |
| WO | 2007/000307 A2 | 1/2007 |

OTHER PUBLICATIONS

Japanese Office Action dated Feb. 19, 2013.
International Search Report for application No. PCT/EP2009/007103 mailed Feb. 1, 2011.
German Office Action, 10 2008 052 893.5-14; Jan. 28, 2010; pp. 1-3.
Chinese Office Action issued Dec. 25, 2013.

* cited by examiner

*Primary Examiner* — Peter Brown
(74) *Attorney, Agent, or Firm* — Fletcher Yoder, P.C.

(57) ABSTRACT

A locking device for an adjustment fitting of a vehicle seat has a locking cam rotatable about a first axis, and an actuation element rotatable about a further axis. The locking device has a locking position and a release position. The actuation element has a toothing system and the locking cam has a mating toothing system. The toothing systems have respective opening flanks, at least one of which is flattened to bring about an initially increased opening transmission ratio in comparison to a further course of the toothing systems.

8 Claims, 3 Drawing Sheets

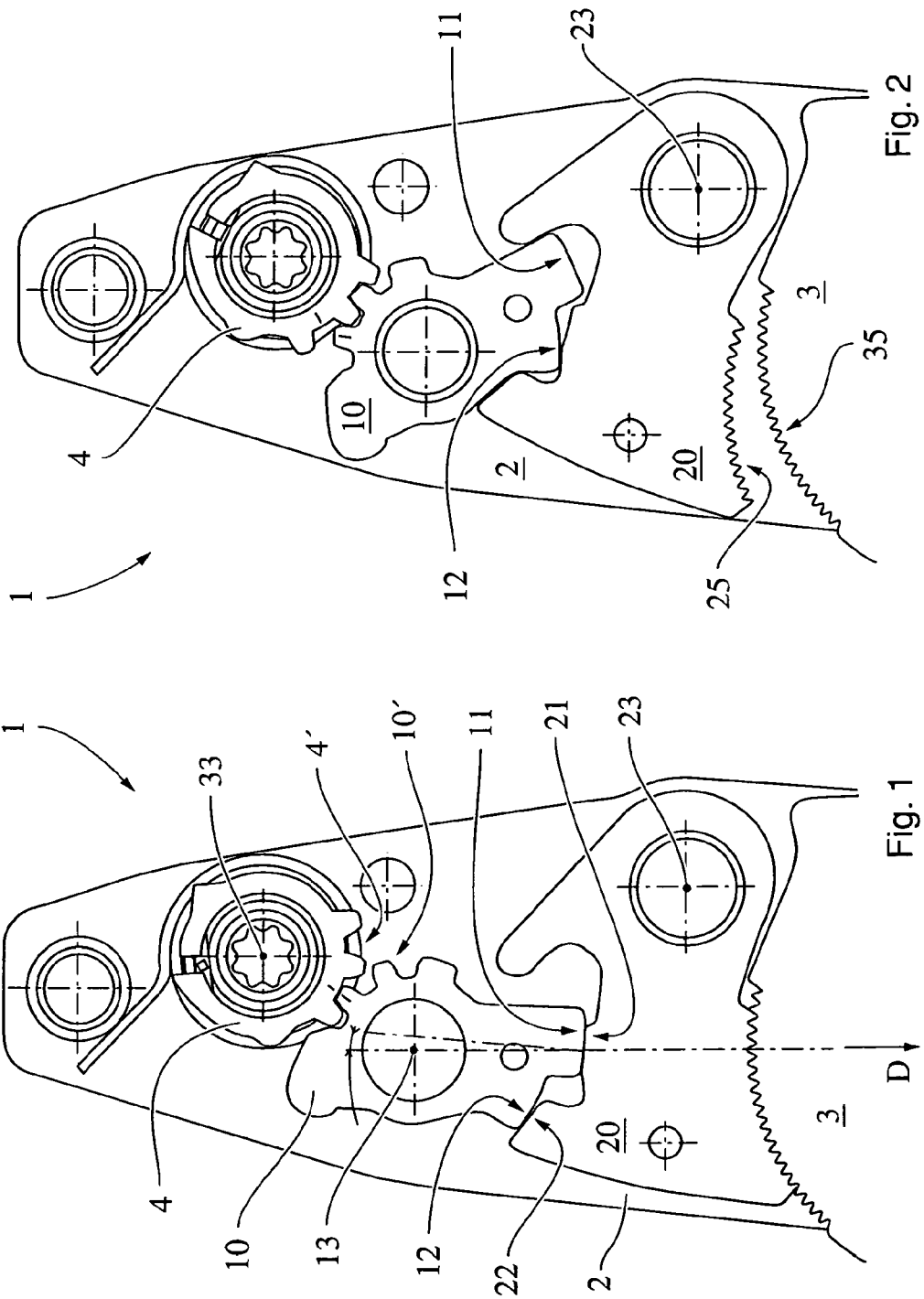

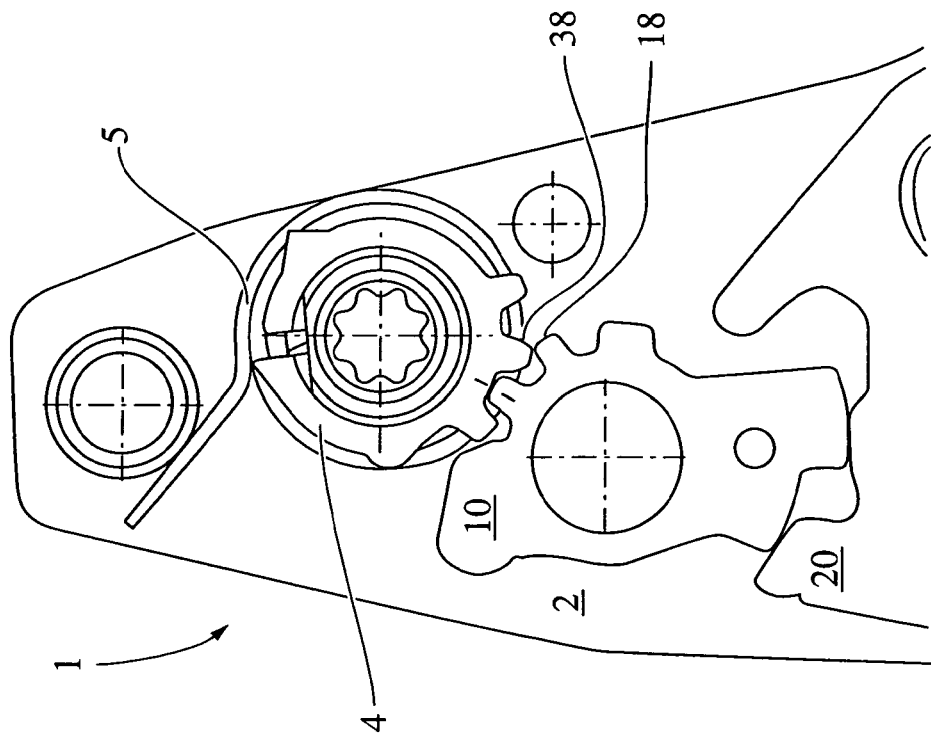
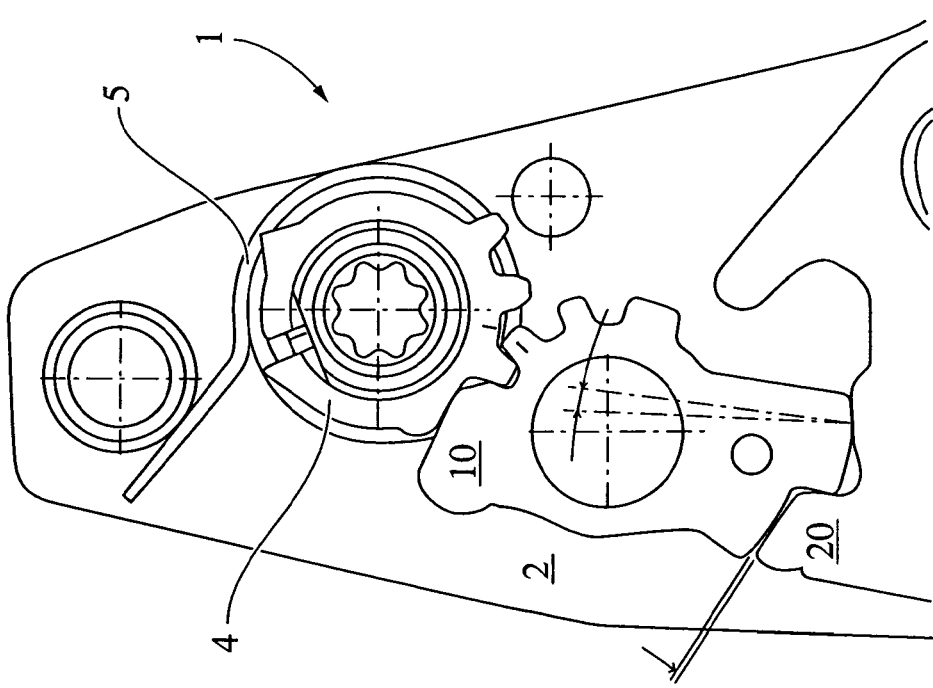

US 8,820,837 B2

LOCKING DEVICE, ESPECIALLY FOR AN ADJUSTMENT FITTING AND ESPECIALLY FOR A VEHICLE SEAT, AND VEHICLE SEAT

CROSS REFERENCE TO RELATED APPLICATIONS

This application claims priority from and the benefit of PCT Application No. PCT/EP2009/007103, filed on Oct. 5, 2009 and German Patent DE 10 2008 052 893.5, filed on Oct. 23, 2008; both entitled "Locking Device, Especially for an Adjustment Fitting and Especially for a Vehicle Seat, and Vehicle Seat", which are herein incorporated by reference.

BACKGROUND

The present invention relates to a locking device, especially for an adjustment fitting and especially for a vehicle seat. By means of the locking device, it is possible to lock or to unlock an adjustment fitting, that is to say, in particular, to lock and to unlock the adjustment of a first fitting part of the adjustment fitting and a second fitting part of the adjustment fitting relative to one another.

Locking devices for vehicles, in particular for vehicle seats, have to withstand great loadings, in order not to open (or to unlock) unintentionally, in particular, in an accident situation and, as a result, to represent a risk for vehicle occupants. Secondly, however, locking devices for vehicles are also to be easy to operate in normal operating situations, that is to say those situations, in which no increased acceleration forces act on the vehicle, that is to say, in particular, to be unlockable in a pleasant way for a user, for example. To this end, it is proposed in document WO 2007/000307 A2 that an actuation element for unlocking the locking device is provided in two pieces.

SUMMARY

The invention is based on the object of providing a locking device for locking or unlocking an adjustment fitting which can be easily unlocked in an inexpensive way and can be mounted quickly and simply, and which nevertheless provides very satisfactory safety with respect to unwanted or unsecured opening movements.

This object is achieved by a locking device, especially for an adjustment fitting and especially for a vehicle seat, the locking device having a locking cam which can be rotated about a first rotational axis and an actuation element which can be rotated about a further rotational axis, it being possible for the locking device to be set into a locking position and into a release position, the actuation element having a toothing system, the locking cam having a mating toothing system, the mating toothing system meshing with the toothing system, the mating toothing system having a first opening flank, the toothing system having a second opening flank, and at least one of the opening flanks being provided in a flattened manner in order to bring about an increased opening transmission ratio in comparison with the further course of the toothing systems. According to the invention, it is possible using simple means as a result to combine easy unlockability with a comparatively simple construction and a comparatively low mounting outlay, and nevertheless to ensure satisfactory and reliable locking of the locking device. Furthermore, it is possible according to the invention also to achieve blocked locking, by means of a pitch error, to counteract automatic opening of the locking device, in particular under load, for example in the case of an ECE R17 test (unoccupied vehicle seat with load blocks behind the seat).

Further preferred refinements of the invention are stated in the subclaims.

According to the invention, it is particularly preferred that both the first and the second opening flanks are provided in a flattened manner in order to bring about an initially increased opening transmission ratio in comparison with the further course of the toothing systems. Furthermore, it is preferred according to the invention that an increase of the opening transmission ratio is provided between the opening flanks as the opening movement increases. As a result, particularly reliable and at the same time easily operable operation of the locking device is possible.

Furthermore, it is preferred according to the invention that a gap is provided between the first opening flank and the second opening flank. As a result, different tolerance situations can be allowed for according to the invention. According to the invention, despite a pitch error between the toothing system and the mating toothing system, the locking travel of the locking device can therefore be particularly small.

Furthermore, it is also particularly preferred according to the invention that the mating toothing system has a first closing flank, that the toothing system has a second closing flank, and that that tooth gap of the toothing system which adjoins the second closing flank is provided in an enlarged manner in comparison with that tooth of the mating toothing system which is arranged in the region of the first closing flank and meshes with it, in order to bring about a blocking function. As a result, a pitch error is realized which, according to the invention, lies, in particular, from 3° to 7°, preferably in the range from 4° to 6°, very particularly preferably at 5.5°. Here, blocked locking can be achieved which counteracts automatic opening of the locking device. The pitch error can also be configured to be smaller without blocked locking.

Furthermore, it is preferred according to the invention that the locking cam is provided in a spring preloaded manner, prestressed into the locking position.

A further subject matter of the present invention relates to a vehicle seat having a seat part, having a backrest part and having an adjustment fitting, a locking device according to the invention being provided as part of the adjustment fitting.

DRAWINGS

Exemplary embodiments of the invention are shown in the drawing and will be explained in greater detail in the following description. The figures do not restrict the general concept of the invention.

FIG. 1 shows a locking device according to the invention in its locking position, in side view.

FIG. 2 shows the locking device according to the invention in its release position, in side view.

FIG. 3 shows the locking device according to the invention in its locking position, in side view, there being slightly different dimensions of the locking cam relative to the locking pawl in comparison with the illustration according to FIG. 1.

FIG. 4 shows the locking device according to the invention in the state of realizing a blocking function.

DETAILED DESCRIPTION

Figure 5:
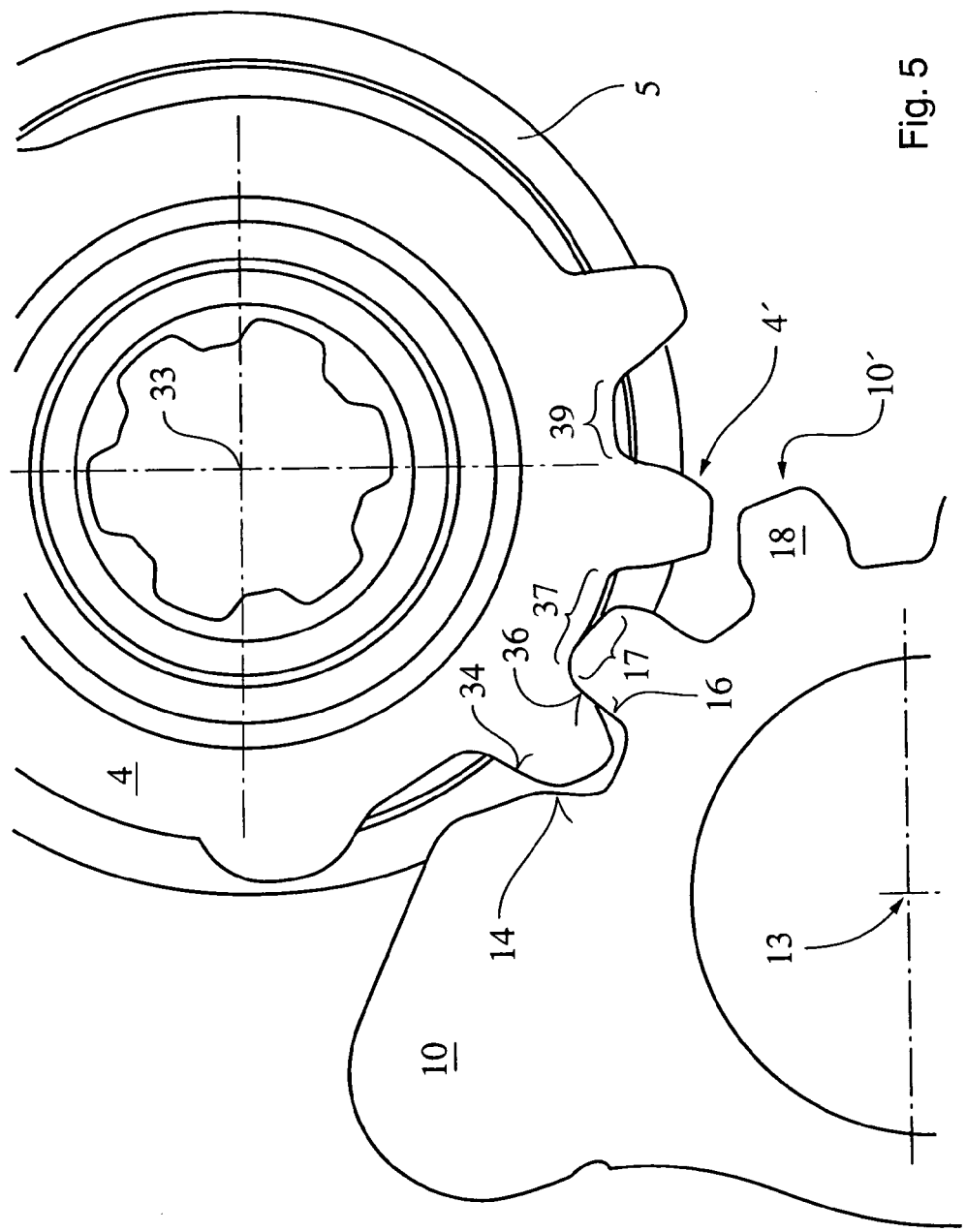
FIG. 5 shows an illustration of a detail of the locking device according to the invention.

FIGS. 1 to 3 show a locking device 1 according to the invention, in side view. The locking device 1 has a locking cam 10 which is provided such that it can be rotated or pivoted about a first rotational axis 13. Furthermore, the locking device 1 has a locking pawl 20 which is provided such that it can be rotated or pivoted about a second rotational axis 23. The locking device 1 is, in particular, part of an adjustment fitting (not itself shown by means of a designation in the figures), the adjustment fitting comprising, in particular, a first fitting part 2 and a second fitting part 3 and being provided, for example, as a backrest adjustment fitting of a vehicle seat (not shown), a vehicle seat of this type having parts which can be moved relative to one another, for example a seat part and a backrest part, and in each case one of the fitting parts 2, 3 being attached to those parts of the vehicle seat which can be moved relative to one another. Both the locking cam 10 and the locking pawl 20 and the first and second rotational axes 13, 23 are then provided on the first fitting part 2. According to the invention, there is provision, in particular, for the first fitting part 2 to be attached to a backrest (not shown) and for the second fitting part 3 to be attached to a seat part (not shown), or vice versa. Here, the second fitting part 3 can be, in particular, a backrest part-side fitting element of a backrest adjustment fitting (what is known as a recliner), that is to say the second fitting part 3 does not necessarily have to be provided fixed to the seat part (or rotationally fixed to the seat part). The locking device 1 secures, for example, a latching fitting for seat backrest adjustment. To this end, for example, the locking pawl 20 is configured with a first latching toothing system 25 and the second fitting part 3 is configured with a second latching toothing system 35.

The locking device 1 can be set into a locking position which is shown in FIG. 1 and into a release position or unlocking position which is shown in FIG. 2. Between the locking position and the release position, the locking cam 10 is pivoted about the first rotational axis 13 and the locking pawl 20 is pivoted about the second rotational axis 23, in each case in an opposite rotational direction. In the illustration which is selected in FIGS. 1 to 5, in each case the locking pawl 20 is rotated in the clockwise direction for the direction from the locking position to the unlocking position (and vice versa), and the locking cam 10 is rotated in the counterclockwise direction for the direction from the locking position to the unlocking position (and vice versa).

The locking cam 10 has a first locking region 11 and a first safety region 12. The first locking region 11 and the first safety region 12 are arranged substantially behind one another in the circumferential direction about the first rotational axis 13. The locking pawl 20 has a second locking region 21 and a second safety region 22. In the locking position of the locking pawl 20, the second locking region 21 and the second safety region 22 are likewise arranged substantially behind one another in the circumferential direction about the first rotational axis 13. As a result, in the locking position, the first locking region 11 overlaps with the second locking region 21 and the first safety region 12 overlaps with the second safety region 22. In other words, both the first and second locking regions 11, 21 and the first and second safety regions 12, 22 in each case form surfaces with closing cams. According to the invention, there is provision here for the surfaces of the first and second locking regions 11, 21 to touch one another in the locking position, that is to say to be situated in contact with one another, and for the surfaces of the first and second safety regions 12, 22 to not touch one another in the locking position and in a normal use situation of the locking device 1 (that is to say without acceleration forces which are increased (for example, as a consequence of an accident) leading to loading of the locking device 1), but merely to lie opposite one another at a defined (comparatively small) spacing. According to the invention, this spacing is, for example, from approximately 0.1 millimeter to approximately 1.0 millimeter, preferably from approximately 0.15 millimeter to approximately 0.5 millimeter, particularly preferably from approximately 0.2 millimeter to approximately 0.4 millimeter, very particularly preferably approximately 0.24 millimeter. The spacing which is provided in the normal situation between those surfaces of the safety regions 12, 22 which lie opposite one another has the advantage that no breakaway forces at all have to be applied between the safety regions 12, 22 (in a normal use situation), in order to set the locking device 1 into its release position or unlocking position. Contact between the safety regions 12, 22 occurs only in the case of relatively high loadings of the locking device 1 (in particular as a result of deformation of corresponding loaded components or parts), with the result that said safety regions 12, 22 contribute in situations of this type to increased stability of the locking device 1. On account of the arrangement of the second rotational axis 23 on one side of the indicated connecting line between the first rotational axis 13 and the rotational axis (denoted by D) of the first fitting part 2 about the second fitting part 3, according to the invention the holding force of the locking device is greater in one force direction than in the other force direction. In the figures, for example, a rotation of the first fitting part 2 to the left corresponds to a rotation of the backrest to the front; the strength in this rotational direction is also called the forward strength. Accordingly, the strength in the opposite rotational direction is called the backward strength. According to the invention, the backward strength is reinforced, in particular, by the provision of the safety regions. The figures in each case show the case where the first and second locking regions 11, 21 are provided closer to the connecting line than the safety regions 12, 22. According to the invention, however, it can also be provided the other way around (not shown). In particular, the first and the second locking regions 11, 21 are provided on the connecting line between the first rotational axis 13 and the rotational axis D of the first fitting part 2 about the second fitting part 3, or the connecting line intersects these regions.

In order to set the release position starting from the locking position, in particular, an actuating element 4 is provided according to the invention which is prestressed by a spring 5 into a position which corresponds to the locking position of the locking cam 10. (This direction, in which the actuating element 4 is prestressed by the spring 5, corresponds according to the illustration in the drawings to a direction counter to the clockwise direction). To this end, the actuating element 4 has a toothing system 4' which meshes with a mating toothing system 10' of the locking cam 10.

FIG. 3 shows a locking device 1 according to the invention in side view, there being slightly different dimensions of the locking cam 10 relative to the locking pawl 20 in comparison with the illustration according to FIG. 1, on account of the overall tolerance situation. Changes of this type to the dimensions can be ascribed to the tolerances produced during production. According to the invention, despite these tolerances, both secure locking of the locking device and satisfactory unlockability (in particular with small breakaway forces) can be ensured.

FIG. 5 shows an enlarged illustration of a detail of the locking device 1 according to the invention, as a detail from FIG. 1. The locking device 1 has the actuating element 4 which is also called an actuation element 4 in the following text and which is provided for actuating the unlocking of the locking device 1. The toothing system 4' (which is also called second toothing system in the following text) meshes with the mating toothing system 10' (which is also called first toothing system in the following text). The actuation element 4 is rotated (for example, caused by manual actuation by a user) in the clockwise direction in order to cause an opening movement of the locking device 1, which leads to an opening movement of the locking cam 10 counter to the clockwise direction and (subsequently) an opening movement of the locking pawl 20 in the clockwise direction. In this opening movement, a second opening flank 34 (of the toothing system 4') of the actuation element 4 abuts a first opening flank 14 (of the mating toothing system 10') of the locking cam 10. According to the invention, the opening flanks 14, 34 are provided in such a way that an increased opening transmission ratio is provided in comparison with the further course of the toothing systems 4', 10'. As a result, the initial movement of the locking cam 10 starting from its locking position which is shown in FIG. 1 and FIG. 5 can be brought about in a particularly highly stepped up manner. This in turn has the advantageous effect that the maximum force (or the maximum opening moment) which acts on the actuation element 4 in order to open the locking device is lower, which is perceived as being more comfortable to a user. The opening flanks 14, 34 are adapted to one another in such a way that an initially increased transmission ratio of this type is realized. To this end, in particular, a flattened portion of the first opening flank 14 and/or of the second opening flank 34 is provided.

If the radii of the locking cam 10 and of the actuation element 4 which are critical for the toothing system 4' and the mating toothing system 10' were provided, for example, to be equally large, a normal transmission ratio of 1:1 would also be expected in the case of an involute toothing system for the initial movement of the locking cam 10 starting from its locking position. This would bring about a comparatively high so-called breakaway moment, that is to say an application of force to release the locking position of the locking cam 20 (with respect to the locking pawl 20). As a result of the measures according to the invention, this transmission ratio is increased at least initially, for example to 2:1 (during, for example, the first 3° or 5° of the unlocking movement), which leads to a facilitation of the opening movement (smooth transition to the normal transmission ratio).

The spring 5 has the effect of rotating the actuation element 4 in the counterclockwise direction. On account of the toothing system 4' and the mating toothing system 10' which mesh with one another, this leads (without further actuating forces) to the setting of the locking position of the locking device 1. Here, a second closing flank 36 (of the toothing system 4') of the actuation element 4 presses onto a first closing flank 16 (of the mating toothing system 10') of the locking cam 10. For the case where an opening movement takes place which does not start from a movement of the actuation element 4 (but rather starts from a movement of the locking cam 10), the spring 5, furthermore, presses the closing flanks 16, 36 against one another, with the result that there is no change in the relative setting of the toothing system 4' and the mating toothing system 10' with respect to the illustration in FIG. 5, but rather only the locking cam 10 is rotated further in the counterclockwise direction and the actuation element 4 is rotated further in the clockwise direction. In this case, blocking occurs in the case of a further rotation (of the locking cam 10 in the counterclockwise direction and of the actuation element 4 in the clockwise direction) because a first blocking tooth 18 of the mating toothing system 10' comes into contact with a second blocking tooth 38 of the toothing system 4'. Further (automatic and therefore undesired) opening of the locking device 1 on account of an opening movement (which occurs for any reason at all) of the locking cam 10 is therefore prevented effectively and the safety level of the locking device 1 is therefore increased. The blocking of the blocking teeth 38, 18 is shown in FIG. 4 by way of example. It can be seen that, despite the partial movement of the locking cam 10 in the opening direction, there is nevertheless an overlap of the locking regions 11, 21 and the safety regions 12, 22, with the result that the locking device 1 is also locked in the blocking position which is shown in FIG. 4.

The realization both of the mentioned blocking function and of the facilitation of the opening movement by an increase in the transmission ratio between the movement of the actuation element 4 and the locking cam 10 is assisted according to the invention by the provision of a tooth gap 37 (in the region of the toothing system 4' or the actuation element 4) which is relatively enlarged (with respect to the size of a tooth 17 of the locking cam 10 or a normal tooth gap 39). In the case of a movement in the opening direction which starts from the actuation element 4, this results in the possibility of increasing the initial transmission ratio by adaptation of the opening flanks 14, 34. Furthermore, in the case of a movement in the opening direction which starts from the locking cam 10, this results in the possibility to provide the blocking function according to FIG. 4 if the pitch error is realized to be sufficiently great. The ratio of the enlarged tooth gap 37 to the normal tooth gap 39 in degrees corresponds to the pitch error.

A person skilled in the art knows that the ratios between the toothing system 4' and the mating toothing system 10' can also be reversed (not shown in the figures), that is to say the tooth gap 37 which is present to cause the blocking function could also be provided on the mating toothing system 10' and therefore on the locking cam 10, and the tooth 17 could also correspondingly be provided on the toothing system 4' of the actuation element 4.

LIST OF REFERENCE SYMBOLS

1 Locking device
2 First fitting part
3 Second fitting part
4 Actuating element/actuation element
4' Toothing system
5 Spring
10 Locking cam
10' Mating toothing system
11 First locking region
12 First safety region
13 First rotational axis
13' Pin
14 First opening flank
16 First closing flank
17 Tooth
18 First blocking tooth
20 Locking pawl
21 Second locking region
22 Second safety region
23 Second rotational axis
25 First latching toothing system
33 Further rotational axis
34 Second opening flank
35 Second latching toothing system
36 Second closing flank
37 Tooth gap
38 Second blocking tooth
39 Normal tooth gap
D Rotational axis of the first fitting part

The invention claimed is:
1. A locking device for an adjustment fitting of a vehicle seat, the locking device comprising a locking cam which can be rotated about a first rotational axis and an actuation element which can be rotated about a further rotational axis, the locking cam having a locking position and a release position, the actuation element having a toothing system comprising a first plurality of teeth, the locking cam having a mating toothing system comprising a second plurality of teeth, the mating toothing system meshing with the toothing system, wherein the mating toothing system has a first opening flank on the locking cam, and wherein the toothing system has a second opening flank on a leading circumferential edge of a first tooth of the first plurality of teeth;

wherein a first contour of the second opening flank is different than a second contour of a third opening flank on a leading circumferential edge of a second tooth of the first plurality of teeth, the second and third opening flanks face a direction of rotation of the actuation element, and the second opening flank is configured to contact the first opening flank in response to rotation of the actuation element in the direction of rotation to drive the locking cam toward the release position; and wherein the toothing system has a second closing flank on a trailing circumferential edge of the first tooth of the first plurality of teeth, and a first tooth gap of the toothing system which adjoins the second closing flank is enlarged in comparison with a second tooth gap which adjoins a third closing flank on a trailing circumferential edge of the second tooth of the first plurality of teeth.

2. The locking device as claimed in claim 1, wherein a third contour of the first opening flank is different than a fourth contour of a fourth opening flank on a leading circumferential edge of a first tooth of the second plurality of teeth, contact between the second opening flank and the first opening flank is configured to bring about an increased opening transmission ratio in comparison with further rotation of the actuation element in the direction of rotation, and the opening transmission ratio is a ratio of rotation of the locking cam to rotation of the actuation element.

3. The locking device as claimed in claim 1, wherein the mating toothing system has a first closing flank on a trailing circumferential edge of a first tooth of the second plurality of teeth, and the second tooth of the first plurality of teeth is configured to contact a second tooth of the second plurality of teeth to block rotation of the locking cam toward the release position.

4. The locking device as claimed in claim 1, wherein the locking cam is spring preloaded.

5. The locking device as claimed in claim 4, wherein the locking cam is prestressed into the locking position.

6. A vehicle seat comprising a seat part, a backrest part, and an adjustment fitting comprising the locking device as claimed in claim 1.

7. A locking device for an adjustment fitting of a vehicle seat, comprising:

an activation element rotatable about a first axis and having a toothing system comprising a first plurality of teeth; and a locking cam rotatable about a second axis and having a mating toothing system comprising a second plurality of teeth;

wherein the activation element is configured to rotate in a first direction of rotation to drive the locking cam toward a locking position via interaction of the toothing system with the mating toothing system, and the activation element is configured to rotate in a second direction of rotation, opposite the first direction, to drive the locking cam toward a release position via interaction of the toothing system with the mating toothing system; and wherein a first tooth gap between a first tooth of the first plurality of teeth and a second tooth of the first plurality of teeth is longer than a second tooth gap between the second tooth of the first plurality of teeth and a third tooth of the first plurality of teeth, and the first tooth gap is positioned forward of the second tooth gap along the second direction of rotation.

8. A locking device for an adjustment fitting of a vehicle seat, comprising:

an activation element rotatable about a first axis and having a toothing system comprising a first plurality of teeth; and a locking cam rotatable about a second axis and having a mating toothing system comprising a second plurality of teeth;

wherein the activation element is configured to rotate in a first direction of rotation to drive the locking cam toward a locking position via interaction of the toothing system with the mating toothing system, and the activation element is configured to rotate in a second direction of rotation, opposite the first direction, to drive the locking cam toward a release position via interaction of the toothing system with the mating toothing system;

wherein the first plurality of teeth comprises a first tooth and a second tooth, the second plurality of teeth comprises a first tooth and a second tooth, the first tooth of the first plurality of teeth is positioned forward of the second tooth of the first plurality of teeth along the second direction of rotation, the first tooth of the second plurality of teeth is positioned forward of the second tooth of the second plurality of teeth along the first direction of rotation of the locking cam toward the release position, and the second tooth of the first plurality of teeth is configured to contact the second tooth of the second plurality of teeth to block rotation of the locking cam in the third direction of rotation toward the release position; and wherein a first tooth gap between the first tooth of the first plurality of teeth and the second tooth of the first plurality of teeth is longer than a second tooth gap between the second tooth of the first plurality of teeth and a third tooth of the first plurality of teeth, and the first tooth gap is positioned forward of the second tooth gap along the second direction of rotation.

* * * * *